US005943754A

United States Patent [19]

Plite

[11] Patent Number: 5,943,754

[45] Date of Patent: Aug. 31, 1999

[54] TOOL FOR SPREADING A SNAP RING

[75] Inventor: Thomas Edward Plite, Lowell, Mich.

[73] Assignee: B&T Tool, Lowell, Mich.

[21] Appl. No.: 09/020,167

[22] Filed: Feb. 6, 1998

[51] Int. Cl.[6] .......... B23P 19/04

[52] U.S. Cl. .......... 29/229; 29/268

[58] Field of Search .......... 81/302, 418, 425.5; 29/229, 268

[56] References Cited

U.S. PATENT DOCUMENTS

| | | | |
|---|---|---|---|
| 97,399 | 11/1869 | Holmes | 81/418 |
| 514,799 | 2/1894 | Wildt . | |
| 1,067,195 | 7/1913 | Raithel | 81/302 |
| 2,643,565 | 6/1953 | Mount . | |
| 2,677,982 | 5/1954 | Arras et al. | 29/229 |
| 2,887,110 | 5/1959 | Roeschmann | 81/418 |
| 2,977,674 | 4/1961 | Arthur . | |
| 3,013,331 | 12/1961 | Appenzeller . | |
| 3,484,924 | 12/1969 | Dahl . | |
| 3,681,840 | 8/1972 | Pool . | |
| 4,106,374 | 8/1978 | Dragan . | |
| 4,644,625 | 2/1987 | Sheppard | 29/268 |
| 4,793,224 | 12/1988 | Huang . | |
| 5,212,859 | 5/1993 | Hagerty . | |
| 5,423,113 | 6/1995 | Jezowski | 29/268 |

*Primary Examiner*—Robert C. Watson

*Attorney, Agent, or Firm*—Price,Heleveld, Dewitt & Litton

[57] ABSTRACT

A snap-ring pliers for facilitating quick and easy engagement of the jaw portions thereof with the free ends of a snap-ring includes a pair of pivotally connected handles, and a pair of elongate jaws, one of which extends from each of the handles, with each of the elongate jaws defining a groove extending along the length of the jaw. In accordance with one aspect of the invention, each groove defines an elongate base portion recessed into the jaw and ramp portions laterally adjacent each side of the base portion, with the ramp portions being inclined from a face of the jaw toward the base portion of the groove to facilitate engagement of the jaws with the free ends of a snap-ring, even when the ends of the snap-ring cannot be seen. In accordance with another aspect of the invention, the jaws extend from each of the handles along a line which is at an angle relative to the pivot axis and to the plane in which the handles are pivoted.

13 Claims, 1 Drawing Sheet

TOOL FOR SPREADING A SNAP RING

FIELD OF THE INVENTION

This invention relates generally to a snap-ring pliers for spreading a snap-ring to facilitate assembly and disassembly of various mechanical devices in which components are held together with a snap-ring, and, more particularly, to snap-ring pliers which include jaw members specially configured to quickly and easily facilitate engagement with the free ends of a snap-ring mounted in a location which is not easily accessible and/or where it is difficult to see the free ends of the snap-ring.

BACKGROUND OF THE INVENTION

Snap-rings are commonly used to hold components of mechanical devices together. Often such snap-rings are mounted within a housing or other location which is not easily accessible, and in which the free ends of the snap-ring cannot be easily seen. In such cases, it has often been considered necessary to engage in various time consuming disassembly steps having the sole purpose of facilitating access to the free ends of the snap-ring. An example wherein time consuming disassembly steps are required merely to gain access to the free ends of a snap-ring involves the removal of the viscous coupler from the mainshaft of a transfer case for a four-wheel drive vehicle. In certain four-wheel drive vehicles, the viscous coupler is held in engagement with the mainshaft by a snap-ring located in a transfer case housing. A relatively narrow access cover is provided in the housing in proximity to the free ends of the snap-ring located in the transfer case housing. While there is sufficient clearance to allow removal of the access cover without removing the transfer case from the vehicle, there is not sufficient clearance to allow a mechanic to look inside the housing through the access opening and see the free ends of the snap-ring. Accordingly, it is extremely difficult to locate and engage the free ends of the snap-ring with a pliers. A mechanic could conceivably position a mirror and light source to allow visualization of the free ends of the snap-ring, but this would be a difficult task at best, and it would further reduce the amount of clearance available for manipulation of a tool. Further, the jaws of typical snap-ring pliers extend approximately linearly from the handles, making it extremely difficult, if not impossible, to position the jaws of the pliers for engagement with the free ends of the snap-ring on account of the low clearance between the access opening and other vehicle components when the transfer case is properly mounted on the vehicle. Accordingly, it has been generally deemed necessary to remove the transfer case from the vehicle before attempting to spread the snap-ring in the transfer case to allow separation of the viscous coupler from the mainshaft. Removal of the transfer case from the vehicle and reinstallation thereof is a procedure which typically requires over two hours. The time actually required to remove and replace the viscous coupling, exclusive of the time required for removing and reinstalling the transfer case is typically about one hour. Therefore, if the steps of removing and reinstalling the transfer case could be eliminated, it would be possible to remove and replace the viscous coupling in approximately ⅓ of the time presently allotted for this procedure.

It is believed that there are many other examples where considerable savings in time could be achieved if it were possible to spread a snap-ring located in a position where it is difficult to see and/or engage the free ends of the snap-ring with the jaws of typical pliers. Particularly in those cases where there is insufficient clearance to allow a mechanic to manipulate a typical snap-ring pliers or see into an access opening in a housing in which the snap-ring is located, but sufficient clearance to allow the mechanic to reach the access opening.

SUMMARY OF THE INVENTION

The invention provides a pliers-type tool which facilitates spreading of a snap-ring located within a housing or other location which is not easily accessible and/or in which the free ends of the snap-ring cannot be easily seen, thereby substantially reducing the amount of time and effort needed to perform various assembly and disassembly procedures, and in certain cases completely eliminating time consuming steps, thereby substantially reducing labor costs for assembling and disassembling various mechanical devices.

The snap-ring pliers includes a pair of pivotally connected handles, and a pair of elongate jaws, one extending from each of the handles, each of the elongate jaws defining a groove extending along the length of the jaw.

In accordance with one aspect of the invention, each jaw includes a face or side which faces inwardly toward the other jaw and an opposing outwardly facing side, with each jaw including a groove which extends lengthwise along the outwardly facing side of the jaw to facilitate and enhance engagement with free ends of a snap-ring.

In accordance with another aspect of the invention, each groove defines an elongate base recessed into the jaw and ramp portions laterally adjacent each side of the base portion, with the ramp portions being inclined from a side of the jaw toward the base of the groove to allow the free ends of a snap-ring to cam into the grooves, whereby a mechanic can more easily engage the jaws of the pliers with the free ends of the snap-ring using tactile perception without having to rely on sight.

In accordance with another aspect of the invention, the jaws extend from the handles along a line which is at an angle relative to the pivot axis and to the plane in which the handles are provided so that the tool can be inserted and used in areas where there is insufficient clearance for a typical pliers tool in which the jaws extend distally within the plane in which the handles are pivoted.

DESCRIPTION OF THE PREFERRED EMBODIMENT

Figure 1:
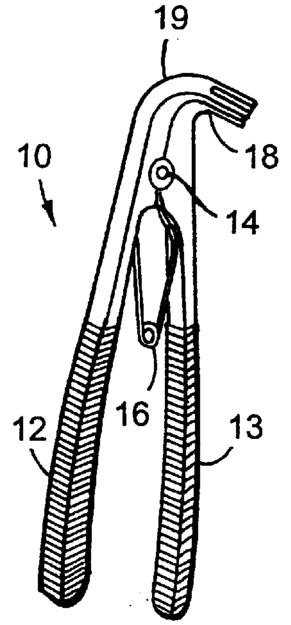
FIG. 1 is a perspective view showing an embodiment of a snap-ring pliers in accordance with the principles of the invention.

In FIG. 1 there is shown a snap-ring pliers 10 including handles 12 and 13 which are pivotally connected about a pivot axle 14. In the illustrated embodiment, a spring 16 is connected to each of the handles 12 and 13 to bias the tool in the closed position as shown in FIG. 1. Attached to the distal ends of the handle portion 12 are opposing, co-acting jaws 18 and 19.

Figure 2:
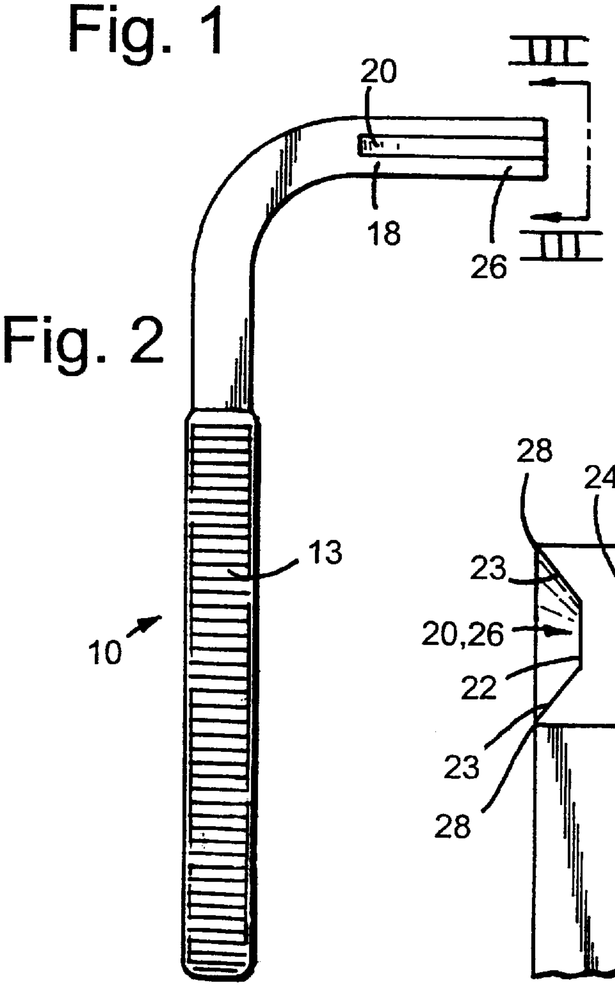
FIG. 2 is a side elevational view of the pliers shown in FIG. 1.

As can be seen by reference to FIG. 2, jaws 18 and 19 extend from handles 12 and 13, respectively, at an angle out of the plane in which the handles are pivoted with respect to each other. In particular, it has been found to be highly advantages in cases where there is little clearance adjacent the free ends of a snap-ring to provide pliers in which the jaws extend at approximately a right angle from the plane in which the handles are pivoted with respect to each other, with it being most preferable to provide jaws which extend outwardly from the handles at an angle of from about 80° to about 100° with respect to the plane in which the handles are pivoted.

Figure 3:
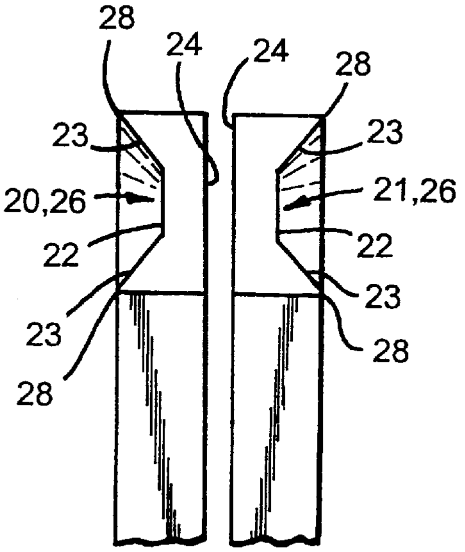
FIG. 3 is an enlarged, fragmentary, end view of the pliers as viewed along lines III—III of FIG. 2.

The jaws of the snap-ring pliers each include an elongate groove 20, 21 which extends along the length of each of the respective jaws 18 and 19. As best illustrated in FIG. 3, each groove 20, 21 defines an elongate base portion 22 which is recessed into the jaw, and ramp portions 23 which are laterally adjacent each side of the base portion, and which are inclined from a side of the jaw toward the base of the groove.

Each jaw 18, 19 includes a side or face 24 which faces inwardly toward the other jaw and an opposing outwardly facing side or face 26. Grooves 20 and 21 are located on the outwardly facing sides 26. In the illustrated embodiment, base portions 22 of grooves 20 and 21 provide a flat surface in a plane which is approximately perpendicular to the plane in which the handles are pivoted.

In accordance with a preferred aspect of the invention, the inclined ramp portions 23 of grooves 20, 21 extend substantially from one of opposing edges 28 of the jaw to the recessed base 22 of the groove. By having the ramp portions 23 extend from the edges of the jaws, a mechanic need only engage a portion of the jaws with a portion of the respective free ends of a snap-ring in order to securely retain the free ends of the snap-ring within the grooves 20, 21, as the ends of the snap-ring will tend to slide or cam along the ramp portions until they become trapped against the base portion. The illustrated structure thereby facilitates easy engagement of the jaws with the free ends of the snap-ring without having to rely on sight for proper alignment.

By having the jaws project at an angle from the plane in which the handles are pivoted, and by providing snap-ring engaging grooves, tool 10 can be used for easily spreading a snap-ring which could not otherwise be accessed with conventional pliers. The grooves 20, 21 allow quick and accurate engagement with the snap-ring, even when the snap-ring cannot be seen.

The above description is considered that of the preferred embodiments only. Modifications of the invention will occur to those skilled in the art and to those who make or use the invention. Therefore, it is understood that the embodiment shown in the drawings and described above are merely for illustrative purposes and not intended to limit the scope of the invention, which is defined by the following claims as interpreted according to the principles of patent law, including the doctrine of equivalents.

The invention claimed is:

1. A snap-ring pliers comprising:

a pair of pivotally connected handles; and a pair of elongate jaws, one extending from each of the handles, each of the elongate jaws defining a groove extending along the length of the jaw, each groove defining an elongate base portion recessed into the jaw and ramp portions laterally adjacent each side of the base portion, the ramp portions being inclined from a face of the jaw toward the base portion of the groove, wherein the handles are pivotable within a plane normal to a pivot axis about which the handles are pivotable with respect to each other, and wherein the base portion of each groove provides a flat surface in a plane which is approximately perpendicular to the plane in which the handles are pivotable.

2. The snap-ring pliers of claim 1 wherein the inclined ramp portions of each groove extend substantially from one of opposing edges of a face of the jaw to the recessed base portion of the groove.

3. The snap-ring pliers of claim 1 wherein the inclined ramp portions of each groove extends substantially from one of opposing edges of a face of the jaw to the recessed base portion of the groove.

4. The snap-ring pliers of claim 1 wherein each of the jaws extends outwardly from a respective one of the handles at an angle of from about 80° to about 100° with respect to the plane in which the handles are pivotable.

5. The snap-ring pliers of claim 1 wherein each jaw includes a face which faces inwardly toward the other jaw and an opposing outwardly facing face, the groove on each jaw being located on the outwardly facing faces thereof.

6. A snap-ring pliers comprising:

a pair of pivotally connected handles; and a pair of elongate jaws, one extending from each of the handles, each jaw including a face which faces inwardly toward the other jaw and an opposing outwardly facing face, each jaw including a groove which extends lengthwise along the outwardly facing face of the jaw to facilitate and enhance engagement with free ends of a snap-ring, wherein each of the jaws extends outwardly from a respective one of the handles at an angle of from about 80° to about 100° with respect to the plane in which the handles are pivotable.

7. The snap-ring pliers of claim 6 wherein each groove defines an elongate base portion recessed into the jaw and ramp portions laterally adjacent each side of the base portion, the ramp portions being inclined from a face of the jaw toward the base portion of the groove.

8. The snap-ring pliers of claim 6 wherein the handles are pivotable within a plane normal to a pivot axis about which the handles are pivotable with respect to each other, and wherein the base portion of each groove provides a flat surface in a plane which is approximately perpendicular to the plane in which the handles are pivotable.

9. The snap-ring pliers of claim 8 wherein the inclined ramp portion of each groove extends substantially from one of opposing edges of a face of the jaw to the recessed base portion of the groove.

10. A snap-ring pliers comprising:

a pair of pivotally connected handles, the handles being pivotable within a plane normal to a pivot axis about which the handles are pivotable with respect to each other; and a pair of elongate jaws, one extending from each of the handles along a line which is at an angle relative to the pivot axis and to the plane in which the handles are pivotable, each jaw including a face which faces inwardly toward the other jaw and an opposing outwardly facing face, each jaw defining a groove which extends lengthwise along the outwardly facing face of the jaw to facilitate and enhance engagement with free ends of a snap-ring each groove defining an elongate base portion and ramp portions laterally adjacent each side of the base portion, the ramp portions being inclined from a face of the jaw toward the base portion of the groove, the base portion of each groove providing a surface in a plane which is approximately perpendicular to the plane in which the handles are pivotable.

11. The snap-ring pliers of claim 10 wherein the inclined ramp portions of each groove extends substantially from one of the opposing edges of a face of the jaw to the recessed base portion of the groove.

12. The snap-ring pliers of claim 10 wherein each of the jaws extends outwardly from a respective one of the handles at an angle of from about 80° to about 100° with respect to the plane in which the handles are pivotable.

13. The snap-ring pliers of claim 11 wherein each of the jaws extends outwardly from a respective one of the handles at an angle of from about 80° to about 100° with respect to the plane in which the handles are pivotable.

* * * * *